United States Patent [19]

Takita et al.

[11] Patent Number: 5,021,073
[45] Date of Patent: Jun. 4, 1991

[54] METHOD OF MANUFACTURING SYNTHETIC SILICA GLASS

[75] Inventors: Masatoshi Takita; Takaaki Shimizu, both of Joetsu, Japan

[73] Assignee: Shin-Etsu Chemical Co., Ltd., Tokyo, Japan

[21] Appl. No.: 576,224

[22] Filed: Aug. 31, 1990

[30] Foreign Application Priority Data

Sep. 4, 1989 [JP] Japan .................. 1-228906

[51] Int. Cl.$^5$ .............................. C03B 19/06
[52] U.S. Cl. ...................... 65/18.1; 65/901; 501/12; 501/33
[58] Field of Search .................. 65/17, 18.1, 901; 501/12, 33

[56] References Cited

U.S. PATENT DOCUMENTS

| | | |
|---|---|---|
| 4,680,048 | 7/1987 | Motoki et al. .................. 65/17 |
| 4,680,049 | 7/1987 | Onorato et al. .................. 65/18.1 |
| 4,801,318 | 1/1989 | Toki et al. .................. 65/18.1 |

*Primary Examiner*—Robert L. Lindsay
*Attorney, Agent, or Firm*—McAulay Fisher Nissen Goldberg & Kiel

[57] ABSTRACT

A method for manufacturing synthetic silica glass by reacting methyl silicate and aqueous ammonia, dispersing the silica particles produced in water, solidifying the silica by the addition of methyl silicate and heating, dehydrating, de-solventing, decarburizing and sintering the solid silica to produce a glass product. The sintered glass may be pulverized to produce a powder. The inventive method is easily carried out and avoids the high energy costs of the prior art. The glass product obtained exhibits excellent high temperature viscosity.

9 Claims, 1 Drawing Sheet

METHOD OF MANUFACTURING SYNTHETIC SILICA GLASS

BACKGROUND OF THE INVENTION

I. Field of the Invention

The present invention relates to synthetic silica glass and a method for manufacture thereof. More particularly, the invention relates to synthetic silica glass having high purity which exhibits high viscosities at high temperatures. The inventive glass performs well when made into heat-resistant devices and used in a semiconductor single crystal ingot pulling apparatus.

II. Description of the Prior Art

Crucibles such as those used in single crystal pulling apparatuses, and especially those used in silicon single crystal pulling apparatuses, are commonly made from natural quartz glass because of its excellent heat-resistant property. However, natural quartz glass contains a relatively large amount of impurities which results in serious contamination problems with single crystal ingots. The tendency towards higher integration of semiconductor memories has increased the demand for single crystal semiconductors of higher purity. This has resulted in an increased occurrence of out-of-specification wafers. Attempts have been made to develop methods for making high purity synthetic silica glass that can replace natural quartz glass.

An example of such a method involves hydrolyzing a silicon compound such as silicon tetrachloride in an oxyhydrogen flame to obtain silica grains. After melting the silica grains, the resulting quartz glass is cast in the shape of a crucible, etc. However, a problem with this method is that since as much as 1000 ppm of OH groups are retained in the glass, the viscosity becomes excessively low at high temperatures, and, in the vacuum, the glass foams at high temperatures.

Another example of such method employs a plasma jet flame in place of the oxyhydrogen flame. However, the cost of this method is high and it is difficult to carry out on a mass production basis.

Also, the so-called "sol-gel" method is known wherein an alkoxysilane is hydrolyzed in an alcoholic solvent in the presence of an acid catalyst to obtain silica, which is then sintered to form a synthetic silica glass. Although it is possible to obtain high purity silica glass at a relatively low cost, this method is disadvantageous because of an excessive tendency to retain OH groups and long manufacturing times. Also, it is difficult to obtain silica glass which maintains a high viscosity at high temperature.

The present inventors have developed the following methods based on the sol-gel process for manufacturing synthetic silica glass having high viscosities at high temperatures:

1. Methyl silicate is hydrolyzed in methanol in the presence of ammonia to obtain granular silica having a mean particle diameter of 200–3,000 nm, and this silica is sintered, pulverized and then melted at 1,700° C. (ref. U.S. Pat. No. 4,979,973);

2. Methyl silicate is hydrolyzed in the presence of ammonia to obtain primary granular silica having a mean particle diameter of 100 to 500 nm. This silica is conglomerated to form flocks (secondary granular silica) having a mean particle diameter of 10 to 100 μm, which is separated from the solvent, sintered, pulverized, sieved, melted at 1,700° C. and molded (ref. U.S. Pat. No. 4,979,973);

3. Methyl silicate is hydrolyzed in the presence of ammonia to obtain silica, which is sintered under a reduced pressure at a temperature between 1,500° and 1,700° C., and further sintered under atmospheric pressure or an elevated pressure at a temperature between 1,800° and 2,000° C. (ref. Japanese Patent Application No. 1-139619).

While these methods produce synthetic silica glass having high high-temperature viscosity, they require relatively lengthy process time and high energy cost for the high sintering temperatures required, i.e., 1,500° to 1,900° C.

SUMMARY OF THE INVENTION

We have discovered a method for manufacturing synthetic silica glass powder which solves the above problems. This is achieved by the following steps: reacting methyl silicate and aqueous ammonia in a reactor; collecting globular silica particles produced from the reaction between the methyl silicate and ammonia; dispersing the silica particles in water to obtain a silica dispersion solution having a pH value of 9 to 13; solidifying the silica by adding methyl silicate to the solution in an amount such that the silica contained in the additive methyl silicate accounts for 5 to 20% of the overall silica; heating, dehydrating, de-solventing (removing solvent), decarburizing, and sintering the solid at a temperature of 1400° C. or higher, advantageously, 1,400° to 1,600° C. If desired, the sintered glass may be pulverized to provide a powdered product.

The present process is advantageous because it: (1) allows the hydrolysis of the methyl silicate to proceed spontaneously and thus continuously, e.g., by continuously dripping the reactants into the reactor; (2) increases the compactness of the silicate obtained from the hydrolysis; (3) lowers the conventional sintering temperature range of 1,500°–1,900° C. to 1,400°–1,600° C.; and (4) makes it easy to pulverize the sintered silica body, by such means as a roll mill, so that the refining process can be dispensed with and hence the energy cost is reduced. Thus, the invented method provides for the manufacture of synthetic silica glass having high viscosities at high temperatures with an improved production efficiency.

DETAILED DESCRIPTION OF THE INVENTION

Figure 1:
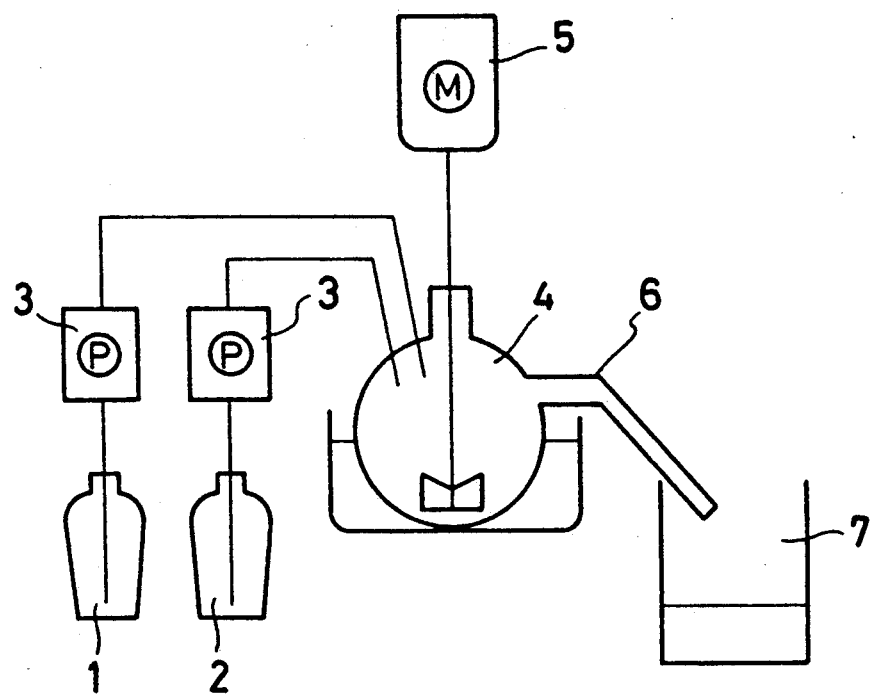
FIG. 1 is a schematic vertical cross-sectional drawing of an apparatus wherein methyl silicate is dehydrated according to the method of the invention.

The synthesis of silica by way of hydrolysis of an alkoxy silane according to the method of the invention comprises reacting methyl silicate and aqueous ammonia as by simultaneously dripping each into a reactor. This operation can be conducted, for example, in an apparatus which is schematically shown in FIG. 1 wherein reference numeral 1 designates a container for methyl silicate and 2 a container for aqueous ammonia. Each container is provided with a quantity measuring pump 3 connected to a reactor 4, which is equipped with a motor driven stirrer 5 and an exhaust port 6 to let out the product into a silica tank 7. Predetermined amounts of the methyl silicate and aqueous ammonia are taken from the containers 1 and 2, respectively, by means of the quantity measuring pump 3, and simultaneously dripped into the reactor 4. The hydrolysis of the methyl silicate begins at the start of the simultaneous dripping, and is continued by stirring of the reactor contents. The silica product is collected in the silica tank 7.

The alkoxy silane used must be methyl silicate, for if ethyl silicate or methyl silicate trimer, for example, is used, the reactivity is so low that the resulting silica particles will be excessively small, and if butyl silicate is used, it is so water-repellent that the hydrolysis scarcely proceeds. The concentration of the ammonia in the aqueous ammonia used is preferably from about 15 to 25 weight %, and the reaction temperature is preferably from about 20° to 45° C.

When the hydrolysis of the methyl silicate is by dripping the methyl silicate and the aqueous ammonia simultaneously, the hydrolysis proceeds on its own, and continuously produces silica particles. This simplifies the reaction process and the product silica particles are relatively large, having a mean particle diameter of 300 to 700 nm. The silica particles are dehydrated until the water content becomes 20 to 30%.

This silica is then dispersed in pure water to obtain a silica dispersion solution, which is then adjusted with ammonia to a pH value of from about 9 to 13. If the solution is neutral or acidic, the strength of the resulting silica glass tends to be poor, and if the basicity of the solution is too strong, e.g., the pH value is 13 or greater, particles are formed which weaken the strength of the resulting silica glass. Therefore, in order to impart appropriate strength to the silica glass, it is necessary to restrict the pH value of the silica dispersion solution to the range of from about 9 to 13.

An appropriate amount of methyl silicate is added to this alkaline silica dispersion solution to thereby solidify the silica in the solution. If the amount of the additive methyl silicate is too small, the solidification will be insufficient so that the strength of the resulting silica glass will be poor, and if the amount of the additive methyl silicate is excessive, the resulting silica glass tends to have reduced high-temperature viscosity. Accordingly, the amount of the methyl silicate added according to the invention, must be such that the silica in the methyl silicate accounts for 5 to 20% of the all silica existing in the silica dispersion solution.

The silica lumps thus obtained are then heated, dehydrated, de-solvented, decarburized and eventually sintered. The heating temperature for the dehydration, de-solventing, and decarburization is preferably from about 800° to 1,000° C. The dehydrated, de-solvented, decarburized silica lumps are then sintered to form a sintered synthetic silica glass body. In the conventional methods, this sintering was conducted at a relatively high temperature range, namely, 1,500° to 1,900° C.; however, with the inventive silica lumps obtained through the above-described method, the sintering temperature range can be relatively low, namely, from aobut 1,400° to 1,600° C., and the sintering time can be as short as 1 to 2 hours.

The thus sintered synthetic silica glass lumps can be pulverized and screened to provide synthetic silica glass powder. The synthetic silica glass lumps obtained with the present invention are easy to crack by means of a roll mill or the like, so that the pulverization step is facilitated. Also, since the possibility of pollution of the synthesized glass with impurities is minimized, the refinery step can be done away with. The synthetic silica glass obtained in accordance with the method of the invention has the advantage of forming a high-quality synthetic silica glass body having high viscosities at high temperatures. This is particularly advantageous when the cracked glass powder is sintered for about 30 minutes at a temperature above 1,700° C., e.g., 1,950° C., and is fused and molded into a shaped body, e.g., a crucible.

EXAMPLES

The following examples illustrate the invention.

EXAMPLES 1-3; COMPARATIVE EXAMPLES 1-2

In all of the following examples, the reactor apparatus shown in FIG. 1 was employed. Methyl silicate and 20 weight % aqueous ammonia were simultaneously dripped into a 5-liter reactor 4 at respective rates of 26.5 lit./hr and 17.2 lit./hr, while the mixture in the reactor 4 was maintained at 40° to 50° C. to thereby undergo a reaction. The reaction was terminated after five hours. A silica sol liquid having a silica concentration of 23% was obtained, which was then dehydrated to give a silica product having a moisture content of 25 weight %.

Next, the silica in an amount of 8 kg was dispersed in 5 liters of distilled water, and the dispersion solution was mixed with 350 liters of 29 weight % aqueous ammonia to thereby produce a pH value of 11. Methyl silicate was added to samples of this silica dispersion solution in amounts such that the silica contained in the additive methyl silicate accounted for 5 weight %, 10 weight %, 20 weight %, 30 weight %, and 40 weight %, respectively, of the all silica existing in the silica dispersion solution, whereupon the solution was solidified. The solids obtained were heated to 1,000° C., dehydrated, de-solvented, decarburized, and eventually sintered at 1,480°±10° C.

The sintered solids were crushed by a roller made of quartz glass, and classified by means of teflon mesh sieves to obtain powders of 50–100 mesh, which were then sintered at 1,950° C. for 30 minutes in an argon atmosphere, and melted and molded into plates measuring 200 mm × 200 mm × 100 mm. The viscosity of these plates at 1,400° C. were measured and the results are shown in the Table.

TABLE

| | additive silica* | visicosity at 1400° C. (poise)** |
|---|---|---|
| Example 1 | 5 wt % | 5.6 × 10$^{10}$ |
| Example 2 | 10 wt % | 5.0 × 10$^{10}$ |
| Example 3 | 20 wt % | 4.9 × 10$^{10}$ |
| Comparative 1 | 30 wt % | 3.2 × 10$^{10}$ |
| Comparative 2 | 40 wt % | 1.9 × 10$^{10}$ |

*Amount of silica in methyl silicate added after pH adjustment
**Measured by Fiber Elongation Method

We claim:
1. A method for manufacturing synthetic silica glass comprising the steps of:
   (a) reacting methyl silicate and aqueous ammonia to produce silica particles;
   (b) dispersing the silica particles in water to obtain a dispersion solution having a pH of from about 9 to 13;
   (c) adding methyl silicate to the solution in an amount such that the silica contained in the additive methyl silicate accounts for 5 to 20% by weight of the overall silica;

(d) heating, dehydrating, de-solventing, and decarburizing the solid silica; and (e) sintering the solid silica at a temperature of about 1400° C. or higher.

2. The method of claim 1 wherein the methyl silicate and ammonia are reacted by adding each to a reaction vessel simultaneously.

3. The method of claim 2 wherein the methyl silicate and ammonia are dripped into the reaction vessel.

4. The method of claim 1 wherein the sintered silica is pulverized.

5. The method of claim 1 wherein the concentration of the aqueous ammonia is in the range from about 15 to 25 weight %, and the reaction temperature is from about 20° to 45° C.

6. The method of claim 1 wherein the silica particles have a means particle diameter of from about 300 to 700 nm, and are dehydrated to a water content of from about 20 to 30%.

7. The method of claim 1 wherein the decarburization is carried out at a temperature of from about 800° to 1000° C.

8. The method of claim 1 wherein the sintering is carried out at a temperature in the range from about 1400° to 1600° C., for a time period from about 1 to 2 hours.

9. The method of claim 1 wherein the sintered particles are fused and molded into a shaped body.

* * * * *